United States Patent
Denda et al.

(10) Patent No.: US 9,498,973 B2
(45) Date of Patent: Nov. 22, 2016

(54) INK JET RECORDING SYSTEM

(71) Applicant: Seiko Epson Corporation, Tokyo (JP)

(72) Inventors: Atsushi Denda, Chino (JP); Shoki Kasahara, Mobara (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/799,905

(22) Filed: Jul. 15, 2015

(65) Prior Publication Data

US 2016/0016402 A1 Jan. 21, 2016

(30) Foreign Application Priority Data

Jul. 16, 2014 (JP) .................................. 2014-145666

(51) Int. Cl.
| | |
|---|---|
| *B41J 2/045* | (2006.01) |
| *B41J 2/21* | (2006.01) |
| *B42D 25/485* | (2014.01) |
| *B41J 11/00* | (2006.01) |
| *C09D 11/322* | (2014.01) |

(52) U.S. Cl.
CPC ................ *B41J 2/21* (2013.01); *B42D 25/485* (2014.10); *B41J 2/2107* (2013.01); *B41J 11/002* (2013.01); *C09D 11/322* (2013.01)

(58) Field of Classification Search
CPC .. B41J 2/2107; B41M 5/0023; C09D 11/322
See application file for complete search history.

(56) References Cited

U.S. PATENT DOCUMENTS

| | | | | |
|---|---|---|---|---|
| 7,303,619 | B2* | 12/2007 | Oyanagi ............... | C09C 1/0015 106/31.6 |
| 2001/0031352 | A1* | 10/2001 | Yamamori ............ | B05D 5/067 428/324 |
| 2009/0162696 | A1* | 6/2009 | Kitamura et al. ............ | 428/701 |
| 2011/0159197 | A1* | 6/2011 | Kurata et al. .............. | 427/421.1 |
| 2011/0221807 | A1* | 9/2011 | Yoshida ................. | B41J 2/2117 347/9 |
| 2012/0052261 | A1* | 3/2012 | Aoyama .............. | B41M 5/0011 428/195.1 |
| 2012/0249668 | A1 | 10/2012 | Denda et al. | |
| 2012/0287200 | A1* | 11/2012 | Yano .................... | C09D 11/101 347/20 |
| 2013/0057616 | A1 | 3/2013 | Hirata et al. | |
| 2013/0286069 | A1* | 10/2013 | Aoyama et al. .................. | 347/9 |

FOREIGN PATENT DOCUMENTS

| | | |
|---|---|---|
| JP | 2001-121804 A | 5/2001 |
| JP | 2012-206481 A | 10/2012 |
| JP | 2013-052654 A | 3/2013 |

* cited by examiner

*Primary Examiner* — Stephen Meier
*Assistant Examiner* — John P Zimmermann
(74) *Attorney, Agent, or Firm* — Harness, Dickey & Pierce, P.L.C.

(57) ABSTRACT

An ink jet recording system includes an ink jet recording device; and a control portion that controls the ink jet recording device, in which when a first mode is selected from a plurality of recording modes, the control portion performs control of recording a security image corresponding to an input image on a recording medium by performing control of forming a glitter image by a glitter ink composition in a first image area on the recording medium, forming a color image by a color ink composition in the glitter image, and forming the color image by the color ink composition on a second image area that is in contact with the first image area.

12 Claims, 6 Drawing Sheets

INK JET RECORDING SYSTEM

BACKGROUND

1. Technical Field

The present invention relates to an ink jet recording system.

2. Related Art

JP-A-2001-121804 discloses an information carrier for preventing forgery in which visible information is changed to non-visible information by varying an angle of an observing view point, in which one of a information image area and a background image area is formed with a concealing layer in which a base body is concealed at a concealing rate of 90% to 100% by glitter ink, and the other is formed of a concealing layer in which a base body is concealed at a concealing rate of 70 to 85% by glitter ink (Example 1). In addition, JP-A-2001-121804 discloses an information carrier for preventing forgery in which both of the information image area and the background image area are formed with concealing layers by glitter ink, and one of the information image area and the background image area is formed with a concealing layer by color ink on a concealing layer by the glitter material (Example 2).

In Example 1 disclosed in JP-A-2001-121804, the information image area and the background image area are printed with the same ink, and the difference between concealing rates in the information image area and the background image area is small, and thus the angle dependence of visibility is low. In addition, in Example 2 disclosed in JP-A-2001-121804, an impact amount of the color ink is small, and thus the angle dependence of visibility is low.

SUMMARY

The invention can be realized by the following exemplary embodiments and the examples described below.

(1) According to an aspect of the invention, there is provided an ink jet recording system including: an ink jet recording device; and a control portion that controls the ink jet recording device, in which the ink jet recording device includes a glitter ink composition including a glitter pigment, a color ink composition including a pigment having a greater visible light absorbing amount than the glitter pigment, and an ejection head that ejects the glitter ink composition and the color ink composition onto a recording medium, the control portion includes a mode selecting portion that selects one recording mode from the plurality of recording modes in which at least one of an ejection amount of the glitter ink composition and an ejection amount of the color ink composition is different, and an ejection amount control portion including the ejection amount of the glitter ink composition ejected from the ejection head and the ejection amount of the color ink composition ejected from the ejection head based on an input image input by the user and the selected recording mode, and when a first mode is selected from the plurality of recording modes, the ejection amount control portion performs control of recording a security image corresponding to the input image on the recording medium by performing control of forming a glitter image by the glitter ink composition in a first image area on the recording medium, forming a color image by the color ink composition in the glitter image, and forming a color image by the color ink composition in a second image area that is in contact with the first image area.

In this ink jet recording system, when the first mode is selected and the security image corresponding to the input image is recorded on the recording medium, control of forming a glitter image by the glitter ink composition in the first image area on the recording medium, forming a color image by the color ink composition in the glitter image, and forming a color image by the color ink composition on a second image area that is in contact with the first image area is performed, and thus a security image in which a change of visibility by a change of a viewpoint angle is significant (security properties are high) can be recorded.

(2) In the ink jet recording system, when a second mode is selected from the plurality of recording modes, the ejection amount control portion may perform control of recording a non-security image corresponding to the input image on the recording medium, by performing control of forming the glitter image by the glitter ink composition on the first image area, and forming the color image by the color ink composition on the glitter image, and an ejection amount for each unit area of the color ink composition on the first image area in the first mode may be greater than an ejection amount for each unit area of the color ink composition on the first image area in the second mode.

In the ink jet recording system, when the security image is recorded in the first mode, if the ejection amount of the color ink composition is caused to be great, the metallic appearance of the glitter image can be lost by scattering of the color image, and thus the security image in which the change of the visibility by the change of the viewpoint angle is significant can be recorded. In addition, when the non-security image is recorded in the second mode, if the ejection amount of the color ink composition is reduced, scattering is suppressed by the color image, and a non-security image in which the metallic color appearance is high can be recorded.

(3) In the ink jet recording system, the first image area or the second image area may be an area corresponding to a character, a bar code, or a diagram in the input image.

(4) In the ink jet recording system, the ejection amount control portion may perform control of forming a clear image by a clear ink composition in which a color material is not substantially contained between the glitter image and the color image in the first image area.

In this ink jet recording system, if a clear image is formed between the glitter image and the color image in the first area by the clear ink composition, even if the ejection amount of the color ink composition is reduced, a security image in which the change of the visibility by the change of the viewpoint angle is significant can be recorded. In addition, if the clear image by the clear ink composition is formed, friction resistance can be improved.

(5) In the ink jet recording system, when a third mode is selected from the plurality of recording modes, the ejection amount control portion may perform control of recording the security image corresponding to the input image on the recording medium by performing control of forming the glitter image in the first image area, forming a clear image by a clear ink composition in which a color material is not substantially contained in the glitter image, and forming the color image on the clear image, and forming the color image in the second image area, and an ejection amount for each unit area of the color ink composition on the first image area in the third mode may be smaller than an ejection amount for each unit area of the color ink composition on the first image area in the first mode.

In this ink jet recording system, when the third mode is selected, the clear image is formed between the glitter image and the color image in the first area by the clear ink composition, and the security image is recorded. Therefore, even if the ejection amount of the color ink composition is reduced, a security image in which the change of the visibility by the change of the viewpoint angle is significant can be recorded. In addition, if the clear image is formed by the clear ink composition, the friction resistance can be improved.

(6) In the ink jet recording system, the control portion may perform a process of notifying a user of a warning when security properties of the security image corresponding to the input image are determined to be low.

In this ink jet recording system, recording of a security image in which the security properties are low (change of visibility by change of viewpoint angle is small) can be prevented.

(7) In the ink jet recording system, the control portion may perform control of changing a color of the color image in the first mode when security properties of the security image corresponding to the input image are determined to be low.

In this ink jet recording system, a security image in which a change of visibility by a change of a viewpoint angle is significant can be recorded.

(8) In the ink jet recording system, the control portion may perform the control of changing the color of the color image so that an L value of the image formed in the first image area and an L value of the image formed in the second image area are close to each other.

In this ink jet recording system, a security image in which a change of visibility by a change of a viewpoint angle is significant can be recorded.

(9) In the ink jet recording system, the control portion may perform control of changing an area of at least one of the first image area and the second image area in the first mode when security properties of the security image according to the input image are determined to be low.

In this ink jet recording system, a security image in which a change of visibility by a change of a viewpoint angle is significant can be recorded.

(10) In the ink jet recording system, a weight of the glitter pigment for each unit area in the glitter ink composition ejected to the first image area in the first mode may be in a range of 0.008 mg/inch$^2$ to 32.3 mg/inch$^2$.

In this ink jet recording system, a security image in which a change of visibility by a change of a viewpoint angle is significant can be recorded.

(11) In the ink jet recording system, a color material weight A for each unit area in the color ink composition ejected to the first image area in the first mode, a color material weight B for each unit area in the color ink composition ejected to the second image area in the first mode, and a glitter pigment weight C for each unit area in the glitter ink composition ejected to the first image area in the first mode may have the following relationships:

$0.3 \geq C/(A+C) \geq 0.045$, $0.3 \geq C/(B+C) \geq 0.045$, and $1.1 \geq A/B \geq 0.9$.

In this ink jet recording system, the metallic appearance of the glitter image can be lost by scattering of the color image, and thus a security image in which a change of visibility by a change of a viewpoint angle is significant can be recorded.

(12) In the ink jet recording system, the control portion may cause a security image creating screen to be displayed on a display portion, and may cause recording data of a security image created for creating the security image to be output on the ink jet recording device.

(13) In the ink jet recording system, when a security pattern image is input in the security image creating screen, the control portion may dispose recording data of the color image around the security pattern in the security pattern image and may generate the recording data of the security image.

In this ink jet recording system, the record data of the color image is automatically disposed around the security pattern in the input security pattern image, the record data of the security image is created, and thus a user can easily create a security image.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Configuration

Figure 1:
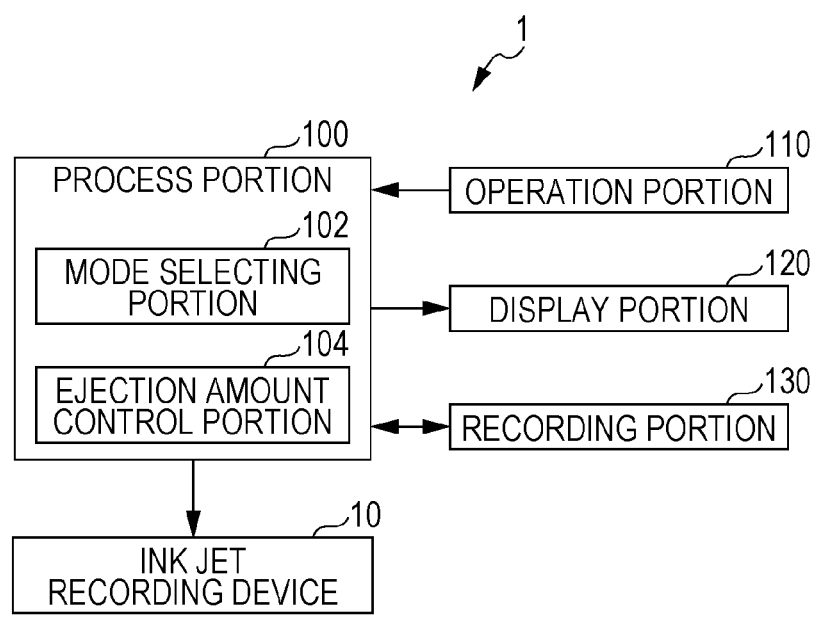
FIG. 1 is a functional block diagram illustrating a configuration of an ink jet recording system according to an exemplary embodiment.

FIG. 1 is a functional block diagram illustrating an ink jet recording system according to an exemplary embodiment.

An ink jet recording system 1 includes an ink jet recording device 10 (ink jet printer), a process portion 100 (example of control portion of the invention), an operation portion 110, a display portion 120, and a recording portion 130. In addition, the process portion 100 and the ink jet recording device 10 are integrated, and a control portion including the ink jet recording device 10 may be formed to perform the function of the process portion 100.

The ink jet recording device 10 includes a glitter ink (metallic ink) composition including a glitter pigment, a color ink composition including a pigment having a greater visible light absorbing amount than the glitter pigment, and an ejection head that ejects the glitter ink composition and the color ink composition onto the recording medium. In addition, the ink jet recording device 10 further includes a clear ink composition that does not substantially contain a color material, and the ejection head may be formed to eject the clear ink composition in addition to the glitter ink composition and the color ink composition.

The operation portion 110 causes a user to input operation information, and outputs the input operation information to the process portion 100. The function of the operation portion 110 can be realized by hardware such as a keyboard, a mouse, buttons, or a touch panel.

The display portion 120 displays an image generated by the process portion 100, and the functions thereof can be realized by LCD, CRT, or the like.

The recording portion 130 stores programs for causing a computer to function as various portions of the process portion 100 or various kinds of data, and functions as a work space of the process portion 100, and the function can be realized by a hard disk, RAM, or the like.

The process portion 100 is connected to the ink jet recording device 10 via a signal cable and a network, and performs a process of controlling the ink jet recording device 10. In addition, the process portion 100 performs a process of converting the input image (for example, image data output from an application program) to print data, and performs control of causing the ink jet recording device 10 to print an image (security image or non-security image corresponding to input image) by outputting the print data or the control signal to the ink jet recording device 10. The process portion 100 includes a mode selecting portion 102 and an ejection amount control portion 104.

The mode selecting portion 102 selects one recording mode from the plural recording modes in which at least one of an ejection amount of the glitter ink composition and an ejection amount of the color ink composition is different. In addition, the mode selecting portion 102 may select a recording mode based on the operation information from the operation portion 110, based on the input image (for example, determination on whether input image is security image). The plural recording modes include a first mode (and third mode) for printing a security image (for recording security image to recording medium) and a second mode for printing a non-security image.

The ejection amount control portion 104 controls an ejection amount of the glitter ink composition ejected from the ejection head and the ejection amount of the color ink composition ejected from the ejection head based on the input image and the recording mode selected by the mode selecting portion 102, and performs control of causing the ink jet recording device 10 to print the security image or the non-security image corresponding to the input image.

When the first mode for printing the security image is selected, the ejection amount control portion 104 performs control of forming the glitter image by the glitter ink composition in the first image area on the recording medium, forming the color image by the color ink composition on the glitter image, and forming the color image by the color ink composition in the second image area that is in contact with the first image area. Here, the first image area is an area corresponding to the character, bar code, diagram, or the like (information image) in the input image, and the second image area is an area corresponding to the background of the character in the input image (background image). In addition, the first image area may be an area corresponding to the background image in the input image, and the second image area may be an area corresponding to the information image in the input image.

In addition, the ejection amount control portion 104 controls the ejection amount of the glitter ink composition so that a weight of the glitter pigment for each unit area in the glitter ink composition that is ejected to the first image area in the first mode is in the range of 0.008 mg/inch$^2$ to 32.3 mg/inch$^2$ (preferably, in the range of 0.02 mg/inch$^2$ to 12.5 mg/inch$^2$). In addition, the ejection amount control portion 104 desirably controls the ejection amounts of the color ink composition and the glitter ink composition so that a color material weight A for each unit area in the color ink composition ejected to the first image area in the first mode, a color material weight B for each unit area in the color ink composition ejected to the second image area in the first mode, and a glitter pigment weight C for each unit area in the glitter ink composition ejected to the first image area in the first mode satisfy the following relationship: $0.3 \geq C/(A+C) \geq 0.045$, $0.3 \geq C/(B+C) \geq 0.045$, and $1.1 \geq A/B \geq 0.9$.

In addition, when the second mode for printing the non-security image is selected, the ejection amount control portion 104 performs control of forming the glitter image by the glitter ink composition to the first image area and forming the color image by the color ink composition to the glitter image. In the second mode, an image is not formed in the second image area. Here, the ejection amount control portion 104 desirably controls the ejection amount of the color ink composition so that the ejection amount for each unit area of the color ink composition on the first image area in the first mode is greater than the ejection amount for each unit area of the color ink composition on the first image area in the second mode.

In addition, when the first mode (and second mode) is selected, the ejection amount control portion 104 may perform control of forming a clear image by the clear ink composition between the glitter image and the color image in the first image area.

In addition, when the third mode for printing the security image is selected, the ejection amount control portion 104 may perform control of forming the glitter image in the first image area, forming the clear image by the clear ink composition in the glitter image, forming the color image in the clear image, and forming the color image in the second image area. Here, the ejection amount control portion 104 may control an ejection amount of the color ink composition so that the ejection amount for each unit area of the color ink composition on the first image area in the third mode is smaller than the ejection amount for each unit area of the color ink composition on the first image area in the first mode.

In addition, when the security properties of the security image corresponding to the input image are determined to be low (change of visibility by the change of viewpoint angle is small), the process portion 100 may perform a process of notifying a warning of the determination to the user (process of outputting image indicating notification content to the display portion 120 and process of outputting voice indicating notification content to speaker). For example, if the color tone (density of color) of the character or the like in the input image does not satisfy a predetermined condition, the security properties of the security image corresponding to the input image may be determined to be low.

In addition, when the security properties of the security image corresponding to the input image are determined to be low, the process portion 100 may perform control of changing the color of the color image in the first mode (and third mode). For example, the process portion 100 may perform control of changing the color of the color image so that an L value (brightness) of the image formed in the first image area and an L value of the image formed in the second image area are close to each other. In addition, when the security properties of the security image corresponding to the input image are determined to be low, the process portion 100 may perform control of changing an area of at least one of the first image area and the second image area in the first mode. For example, when the size of the character or the like in the input image is lower than a predetermined value, the security properties of the security image corresponding to the input image are determined to be low, and the areas of the first image area and the second image area in the first mode may be caused to be large.

In addition, the process portion 100 may output the recording data (print data) of the security image created in a security image creating screen to the ink jet recording device 10 by causing the security image creating screen for creating the security image to be displayed on the display portion 120. Here, when the security pattern image (input image) in the security image creating screen is input, the process portion 100 may generate recording data of the security image by disposing recording data (data for forming color image in second image area) of the color image around the security pattern (character, bar code, diagram, or the like in input image) in the security pattern image.

Figure 2:
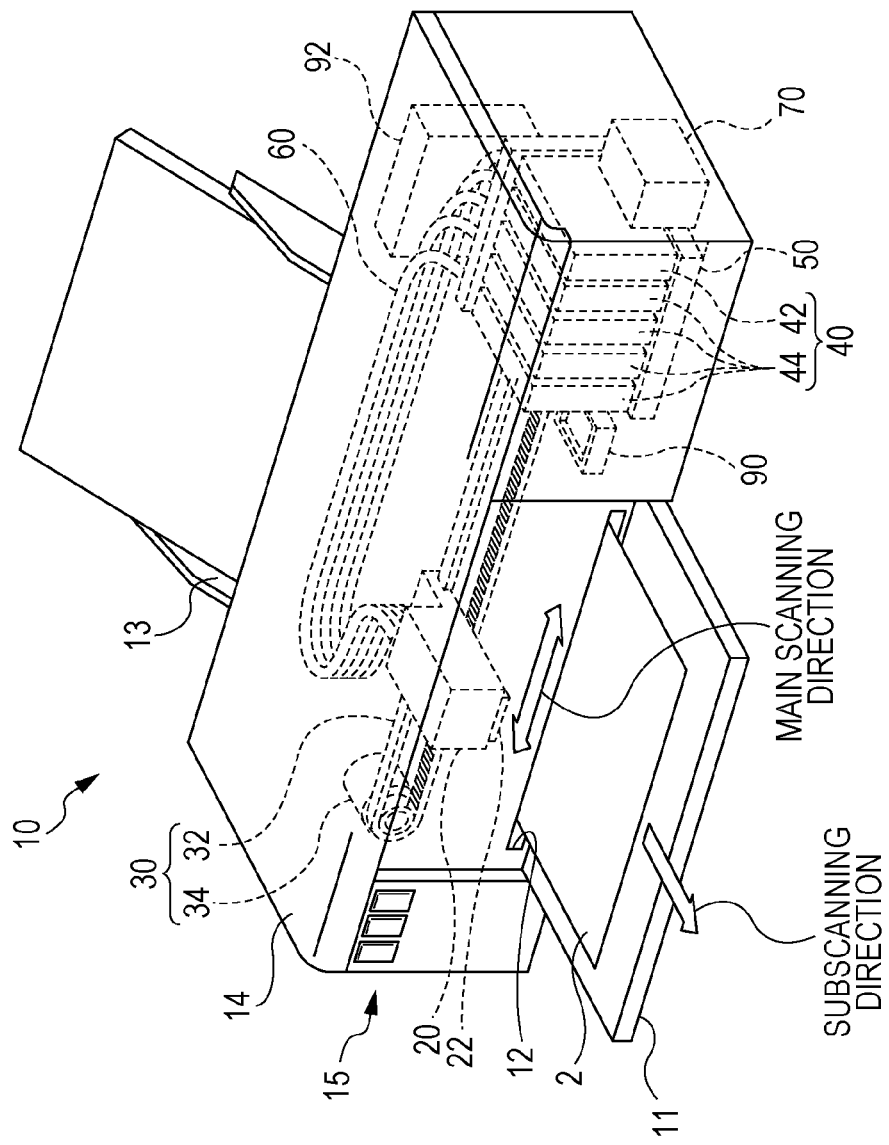
FIG. 2 is a diagram schematically illustrating the ink jet recording device.

FIG. 2 is a diagram schematically illustrating the ink jet recording device 10.

The ink jet recording device 10 has an external shape of a substantially box shape, a front surface cover 11 is provided on substantially the center of the front surface, and plural operation buttons 15 are provided on the circumference thereof. The front surface cover 11 is shaft-supported on the lower end side, so if the upper end side is brought down to the front, a long and narrow paper discharging opening 12 that discharges recording paper 2 (recording medium) is presented. In addition, a paper feeding tray 13 is provided on the rear surface side of the ink jet recording device 10. If the recording paper is set on the paper feeding tray 13 and the operation buttons 15 are operated, the recording paper 2 is drawn from the paper feeding tray 13, after an image is recorded on the surface of the recording paper 2 inside thereof, and the recording paper 2 is discharged from the paper discharging opening 12.

In addition, an upper surface cover 14 is provided on the upper surface side of the ink jet recording device 10. The upper surface cover 14 is shaft-supported on the inner side, and thus, if the upper surface cover 14 is raised to the front side and is opened, the state inside the ink jet recording device 10 can be checked, or the ink jet recording device 10 can be repaired.

A carriage 20 that forms ink dots on the recording paper 2 while reciprocating in a main scanning direction and a driving mechanism 30 that causes the carriage 20 to reciprocate are mounted inside the ink jet recording device 10. A recording head 22 (ejection head) on which plural ejection nozzles ejecting ink onto the recording paper 2 are formed and a sub tank that temporarily stores ejected ink are provided in the carriage 20.

The ink ejected from the ejection nozzles formed on the recording head 22 is stored in dedicated containers called ink cartridges 40. The ink cartridges 40 are mounted in an ink supplying device 50 provided at different places from the carriage 20, and the ink in the ink cartridges 40 is supplied to the carriage 20 via the ink supplying device and ink tubes 60. In addition, an air pump unit 70 driven when the ink in the ink cartridges 40 is supplied to the carriage 20 is provided near the ink supplying device 50.

In addition, in the ink jet recording device 10 (not illustrated), an image can be recorded by using ink such as the glitter ink composition and the color ink composition, and in the recording head 22 mounted in the carriage 20, ejection nozzles are provided for respective kinds of ink. Also, the ink in the corresponding ink cartridges 40 is supplied to the respective ejection nozzles via the ink tubes 60 provided for the respective kinds of ink. In the illustrated example, a glitter ink composition is stored in an ink cartridge 42, and four respective colors (cyan, magenta, yellow, and black) of color ink compositions are stored in four respective ink cartridges 44. In addition, an ink cartridge that stores the clear ink composition may be further installed.

The driving mechanism 30 that causes the carriage to reciprocate includes a timing belt 32 that includes plural tooth forms formed therein and a driving motor 34 that drives the timing belt 32. Since a portion of the timing belt 32 is fixed to the carriage 20, if the timing belt 32 is driven, the carriage 20 can reciprocate in the main scanning direction while by being guided by a guide rail (not illustrated) extending in the main scanning direction.

In addition, a portion called a home position is provided at a position other than the recording area in which the carriage 20 is moved in the main scanning direction, and a maintenance mechanism that performs maintenance so that recording can be normally performed is mounted at the home position. The maintenance mechanism includes a cap member 90 that is tightly pressed onto a surface (nozzle surface) on which the ejection nozzles are formed on the bottom surface side (surface facing the recording paper 2) of the recording head 22 and forms a closed space so as to surround the ejection nozzles, a lifting mechanism (not illustrated) that lifts the cap member 90 so as to tightly press the cap member 90 onto the nozzle surface of the recording head 22, and a suction pump (not illustrated) that causes the closed space formed by the cap member 90 tightly pressed onto the nozzle surface of the recording head 22 to have negative pressure.

Further, inside the ink jet recording device 10, a paper feeding mechanism (not illustrated) that feeds the recording paper 2, a control portion 92 that controls overall operations of the ink jet recording device 10 based on the print data or control signals from the process portion 100, and the like are mounted. An operation of causing the carriage 20 to reciprocate, an operation of feeding the recording paper 2, an operation of ejecting the ink from the ejection nozzle, an operation of driving a maintenance mechanism so that recording can be normally performed, and the like are controlled by the process portion 100 and the control portion 92.

2. Ink

Components that are included or that can be included in the glitter ink composition, the color ink composition, and the clear ink composition that are used in the ink jet recording system according to the exemplary embodiment are described for each ink composition.

2-1. Glitter Ink Composition

The glitter ink composition contains the glitter pigment. The glitter pigment is not particularly limited, as long as a product can express luminosity when being attached to a medium, and examples thereof include one or more alloys (also called metal pigment) selected from the group consisting of aluminum, silver, gold, platinum, nickel, chromium, tin, zinc, indium, titanium, and copper.

A surface treatment may be performed on the glitter pigment so as to suppress the reaction with water. A case in which an aluminum pigment is used as the glitter pigment on which the surface treatment is performed is described as an example.

An example of the aluminum pigment includes a pigment having a flat shape. Examples of the flat shape include a scale shape, a leaf shape, a plate shape, and a film shape. The aluminum pigment may be coated with an inorganic oxide or the like. In some cases, the generation of bubbles in the ink may be suppressed by the coating. If the aluminum pigment has a flat shape, when the ink is attached to the recording medium, satisfactory metallic gloss can be easily obtained.

A 50% average particle diameter R50 (hereinafter, simply referred to as "R50") of an equivalent circle diameter of the aluminum pigment coated with the coating film is calculated from a projected image of particles obtained by a particle image analyzer, and the 50% average particle diameter R50 is preferably in the range of 0.25 µm to 3 µm, more preferably in the range of 0.5 µm to 2 µm, and still more preferably in the range of 0.7 µm to 1.8 µm. If the average particle diameter R50 is in the range described above, the precipitation of the aluminum pigment can be suppressed while the metallic gloss of the recorded image is maintained. According to the exemplary embodiment, the maximum value of the equivalent circle diameter of the aluminum pigment particles is preferably 3 µm or lower. If the equivalent circle diameter of the largest particles is 3 µm or lower, when the particles are used in the ink jet recording device, the clogging of a nozzle opening portion or an ink passage can be suppressed. In addition, the thickness of the aluminum pigment particles is in the range of 5 nm to 100 nm, preferably in the range of 5 nm to 70 nm, and more preferably in the range of 10 nm to 50 nm.

Examples of the material of the coating film when the aluminum pigment has a coating film also preferably include products containing alkoxysilane (for example, tetraethoxysilane (TEOS)), polysilazane, or a compound derived from these compounds, a fluorine-based material, a phosphorus-based material, or a phosphoric acid-based material.

In addition, the aluminum pigment may be supplied in a state of dispersion liquid. As the component contained in the dispersion liquid of the aluminum pigment, water, an organic solvent, a basic catalyst, a surfactant, a tertiary amine, a buffer solution, and the like are included, and can be appropriately combined.

The glitter ink composition may contain at least one of water and an organic solvent (described below) as a solvent. If the glitter ink composition contains water as the solvent, the glitter ink composition is used as so-called aqueous ink. Meanwhile, if the glitter ink composition does not substantially contain water, the glitter ink composition is used as non-aqueous ink.

If the glitter ink composition contains water, water from which ionic impurities are removed as much as possible, pure water such as ion exchanged water, ultrafiltrated water, reverse osmotic water, and distilled water, and ultrapure water are preferably used. In addition, if water sterilized by the irradiation by an ultraviolet ray or the addition of hydrogen peroxide is used, when pigment dispersed liquid or the ink obtained by using the pigment dispersed liquid is stored for a long period of time, the generation of mold or bacteria can be prevented. If the glitter ink composition is aqueous ink, the content of water can be caused to be 50% by mass or more with respect to the total mass of the glitter ink composition.

The glitter ink composition may contain organic solvent. The glitter ink composition may contain plural kinds of organic solvent. The organic solvent is not particularly limited, and examples thereof include 1,2-alkanediols, polyhydric alcohols, pyrrolidone derivatives, lactone, and glycol ethers.

Examples of 1,2-alkanediols include 1,2-propanediol, 1,2-butanediol, 1,2-pentanediol, 1,2-hexanediol, and 1,2-octanediol. Since 1,2-alkanediols have an excellent effect of evenly soaking a recording medium by increasing properties of the ink wettability the recording medium, an image having excellent adhesion properties on the recording medium may be formed. If 1,2-alkanediols are contained, the content may be in the range of 1% by mass to 20% by mass with respect to the total mass of the glitter ink composition.

Examples of polyhydric alcohols include ethylene glycol, diethylene glycol, propylene glycol, dipropylene glycol, 1,3-propanediol, 1,4-butanediol, 1,6-hexanediol, trimethylolpropane, and glycerin. Polyhydric alcohols can be preferably used in view of suppressing drying and solidifying of the ink on the nozzle surface of the recording head of the ink jet recording device and reducing the clogging and ejection disorder. If polyhydric alcohols are contained, the content can be in the range of 2% by mass to 20% by mass with respect to the total mass of the glitter ink composition.

Examples of pyrrolidone derivatives include N-methyl-2-pyrrolidone, N-ethyl-2-pyrrolidone, N-vinyl-2-pyrrolidone, 2-pyrrolidone, and N-butyl-2-pyrrolidone, 5-methyl-2-pyrrolidone. Pyrrolidone derivatives can function as a satisfactory solubilizing agent of a resin component. If pyrrolidone derivatives are contained, the content thereof may be in the range of 0.5% by mass to 10% by mass with respect to the total mass of the glitter ink composition.

Herein, "lactone" is a generic term of a cyclic compound having an ester group (—CO—O—) in a circle. The lactone is not particularly limited, as long as a product is included in the definition described above, and it is preferable that the product is lactone having 2 to 9 carbon atoms. Specific examples of the lactone include α-ethyl lactone, α-acetolactone, β-propiolactone, γ-butyrolactone, δ-valerolactone, ε-caprolactone, ζ-enantiolactone, η-caprylolactone, γ-valerolactone, γ-heptalactone, γ-nonalactone, β-methyl-δ-valerolactone, 2-butyl-2-ethylpropiolactone, and α,α-diethylpropiolactone. Among these, γ-butyrolactone is particularly preferable. The lactone can increase adhesion properties by causing ink to penetrate into a recording medium, when the recording medium is a film of a vinyl chloride resin or the like. Particularly, lactone is preferably used when the glitter ink composition is non-aqueous ink. The content thereof in this case may be in the range of 5% by mass to 30% by mass with respect to the total mass of the glitter ink composition.

Examples of glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. These can be used singly, or two or more types thereof may be used in combination. Glycol ethers can control wettability or penetration speed of ink to a recording medium. Therefore, a clear image with less shade unevenness can be recorded.

When the glitter ink composition is used as aqueous ink, if glycol ethers are caused to be contained, the content thereof is in the range of 0.05% by mass to 6% by mass, with respect to the total mass of the glitter ink composition. Meanwhile, if the glitter ink composition is used as non-aqueous ink, the content thereof is in the range of 70% by mass to 90% by mass with respect to the total mass of the glitter ink composition.

The glitter ink composition may contain a surfactant. The surfactant has a function of decreasing a surface tension and improving wettability to a recording medium. Among the surfactants, for example, acetylene glycol-based surfactant, silicone-based surfactant, and a fluorine-based surfactant can be preferably used.

The acetylene glycol-based surfactant is not particularly limited, and examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all are product names, manufactured by Air Products and Chemicals. Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (all are product names, manufactured by Nissin Chemical Co., Ltd), and Acetylenol E00, E00P, E40, and E100 (all are product names, manufactured by Kawaken Fine Chemicals Co., Ltd.).

The silicone-based surfactant is not particularly limited, and a polysiloxane-based compound is preferably included. The polysiloxane-based compound is not particularly limited, and examples thereof include a polyether-modified organosiloxane. Examples of commercially available products of polyether-modified organosiloxane include BYK-306, BYK-307, BYK-333, BYK-341, BYK-345, BYK-346, and BYK-348 (above are product names manufactured by BYK Japan KK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (above are product names manufactured by Shin-Etsu Chemical Co., Ltd.).

As the fluorine-based surfactant, a fluorine-modified polymer is preferably used, and specific examples thereof include BYK-340 (BYK Japan KK).

If a surfactant is contained, the content thereof is included in the range of 0.1% by mass to 1.5% by mass with respect to the total mass of the glitter ink composition.

The glitter ink composition may contain a resin, a thickener, a pH regulator, a preservative or a fungicide, an antirust agent, a chelating agent, and the like, if necessary.

The resin can improve physical strength of a recorded image such as friction resistance. As the resin, well-known resins such as an acryl-based resin, a styrene acrylic resin, a fluorene-based resin, a urethane-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, an ethylene vinyl acetate-based resin, or polyolefin wax, and the like are included. The resins can be used singly, or two or more types thereof can be used in combination. Among the exemplified resins, a styrene acrylic resin, a polyester-based resin, and a polyolefin wax can be preferably used.

As the polyester-based resin, commercially available products can be used. Examples thereof include Eastek 1100, 1300, and 1400 (above are product names manufactured by Eastman Chemical Japan Limited), and Elitel KA-5034, KA-3556, KA-1449, KT-8803, KA-5071S, KZA-1449S, KT-8701, and KT9204 (above are product names manufactured by Unitika Ltd.).

Examples of the styrene acrylic resin include a styrene-acrylic acid copolymer, a styrene-methacrylic acid copolymer, a styrene-methacrylic acid-acrylic acid ester copolymer, styrene-α-methylstyrene-acrylic acid copolymer, and a styrene-α-methylstyrene-acrylic acid-acrylic acid ester copolymer. In addition, as an embodiment of the copolymer, any one of a random copolymer, a block copolymer, an alternating copolymer, and a graft copolymer can be used. In addition, as the styrene acrylic resin, commercially available products may be used. As the commercially available products of the styrene acrylic resin, Joncryl 62J (BASF Japan Ltd.) and the like are included.

The polyolefin wax is not particularly limited, and examples thereof include wax manufactured with olefin such as ethylene, propylene, and butylene, or derivatives thereof, and copolymers thereof. Specific examples thereof include polyethylene-based wax, polypropylene-based wax, and polybutylene-based wax. Among them, since the generation of a crack in an image can be reduced, polyethylene-based wax is preferable. The polyolefin wax may be used singly, or two or more types thereof can be used in combination.

As commercially available products of polyolefin wax, a Chemipearl series such as "Chemipearl W4005" (manufactured by Mitsui Chemicals, Inc., polyethylene-based wax, particle diameter in the range of 200 nm to 800 nm, softening point of 110° C. measured by ring and ball method, hardness of 3 measured by penetration method, and solid content of 40%) is included. In addition, an AQUACER series such as AQUACER 513 (polyethylene-based wax, particle diameter of 100 nm to 200 nm, melting point of 130° C., solid content of 30%), AQUACER 507, AQUACER 515, and AQUACER 840 (the above are manufactured by BYK Japan KK), a Hitec series such as Hitec E-7025P, Hitec E-2213, Hitec E-9460, Hitec E-9015, Hitec E-4A, Hitec E-5403P, and Hitec E-8237 (the above are manufactured by TOHO Chemical Industry Co., Ltd.), and Nopcote PEM-17 (manufactured by San Nopco Limited, polyethylene emulsion, particle diameter of 40 nm), and the like are included. These are commercially available in a form of aqueous emulsion in which polyolefin wax is dispersed in water by a normal method.

If the resin is contained, the content (amount in terms of solid content) is preferably in the range of 1% by mass to 10% by mass, and more preferably in the range of 1% by mass to 7% by mass with respect to the total mass of the glitter ink composition.

A thickener is used for adjusting the viscosity of ink. Examples of the thickener include polyvinyl alcohols, poly (meth)acrylic acids, polyethers, polyvinylpyrrolidones, polyvinyl formals, protein (for example, gelatin, casein, and glue), polysaccharide (for example, pullulan, dextran, dextrin, cyclodextrin, carrageenan, pectin, glucomannan, sodium alginate, xanthan gum, arabic gum, locust bean gum, gum tragacanth, guar gum, and tamarind gum), starches (for example, starch, oxidized starch, carboxylated starch, and dialdehyde starch), cellulose or derivatives thereof (for example, methyl cellulose, ethyl cellulose, carboxymethyl cellulose, hydroxyethyl cellulose, hydroxypropyl cellulose, and hydroxypropyl methylcellulose), alginic acid salt (for example, sodium alginate, potassium alginate, and ammonium alginate), and alginic acid ester (for example, propylene glycol alginate). If a thickener is contained, the content thereof can be appropriately set according to the viscosity of the glitter ink composition, and, for example, the content can be set in the range of 1% by mass to 10% by mass with respect to the total mass of the glitter ink composition.

Examples of the pH regulator include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium bicarbonate.

Examples of the preservative or the fungicide include sodium benzoate, sodium pentachlorophenol, sodium 2-pyridinethiol-1-oxide, sodium sorbate, sodium dehydroacetate, and 1,2-dibenzisothiazolin-3-one. Commercially available products include Proxel XL2 and Proxel GXL (above are product names manufactured by Avecia), and Denicide CSA, and NS-500 W (above are product names manufactured by Nagase ChemteX Corporation).

An Example of the antirust agent includes benzotriazole.

Examples of the chelating agent include ethylenediaminetetraacetic acid and salts thereof (ethylenediaminetetraacetic acid disodium salt dihydrate).

2-2. Color Ink Composition

The color ink composition is ink that expresses black, cyan, magenta, yellow, black, and the like when being attached to the recording medium.

The color ink composition contains a color material such as a dye and a pigment. The dye and the pigment disclosed in the specification of U.S. Patent Application Publication No. 2010/0086690, the specification of U.S. Patent Application Publication No. 2005/0235870, and International Publication No. WO2011/027842 can be appropriately used. Among the dyes and the pigments, it is further preferable to contain a pigment. The pigment is preferably an organic pigment in view of storage stability such as light resistance, weather resistance, and gas resistance.

Specifically, the pigment uses azo pigments such as an insoluble azo pigment, a condensed azo pigment, azo lake, and a chelate azo pigment, a polycyclic pigment such as a phthalocyanine pigment, a perylene and perinon pigment, an anthraquinone pigment, a quinacridone pigment, a dioxane pigment, a thioindigo pigment, an isoindolinone pigment, and a quinophthalone pigment, dye chelate, a lake pigment, a nitro pigment, a nitroso pigment, aniline black, a daylight fluorescent pigment, and carbon black. The pigments can be used singly, or two or more types thereof can be used in combination.

In addition, as dyes, for example, various dyes that are used in common ink jet recording such as a direct dye, an acidic dye, an edible dye, a basic dye, a reactive dye, a disperse dye, a vat dye, a soluble vat dye, and a reactive disperse dye can be used.

The content of the color material is preferably in the range of 1% by mass to 20% by mass, and more preferably in the range of 1% by mass to 15% by mass with respect to the total mass of the color ink composition.

The color ink composition can contain at least one of water and an organic solvent, as the solvent. If the color ink composition contains water as the solvent, the color ink composition is used as so-called aqueous ink. Meanwhile, if the color ink composition does not substantially contain water, the color ink composition is used as so-called non-aqueous ink.

If water is contained, water from which ionic impurities are removed as much as possible, such as pure water such as ion exchanged water, ultrafiltrated water, reverse osmotic water, and distilled water, and ultrapure water is preferably used. In addition, if water sterilized by the irradiation by an ultraviolet ray or the addition of hydrogen peroxide is used, when pigment dispersed liquid and the ink obtained by using the pigment dispersed liquid is stored for a long period of time, the generation of mold or bacteria can be prevented.

If the color ink composition is aqueous ink, for example, the content of water can be 50% by mass or higher with respect to the total mass of the color ink composition.

The color ink composition may contain an organic solvent, a surfactant, a resin, a pH regulator, a preservative or a fungicide, an antirust agent, and a chelating agent, if necessary. The specific examples of the components and the scope of the addition amount when the components are contained are as described for the glitter ink composition, and thus the descriptions thereof are omitted.

2-3. Clear Ink Composition

The clear ink composition is transparent ink that does not substantially contain the color material. In addition, the expression "not substantially containing A" means A is not added to exceed an amount in which the effect of adding A is sufficiently achieved. A specific example of not substantially containing A is containing A not in an amount of 1.0% by mass or more, preferably not in an amount of 0.5% by mass or more, more preferably not in an amount of 0.1% by mass or more, still more preferably not in an amount of 0.05% by mass or more, particularly preferably not in an amount of 0.01% by mass or more, and further more preferably not in an amount of 0.001% by mass or more.

The clear ink composition preferably contains the resin. Examples of the resin contained in the clear ink composition include a resin such as a urethane-based resin, an ester-based resin, a fluorene-based resin, an acryl-based resin, a polyolefin-based resin, a rosin-modified resin, a terpene-based resin, a polyamide-based resin, an epoxy-based resin, a vinyl chloride-based resin, a vinyl chloride-vinyl acetate copolymer, and an ethylene vinyl acetate-based resin, and polyolefin wax. Among these, a urethane-based resin, an ester-based resin, a fluorene-based resin, and an acryl-based resin are preferable.

The urethane-based resin is a polymer synthesized by causing polyisocyanate and polyol to react with each other. The urethane-based resin can be synthesized by a well-known method.

Examples of polyisocyanate include chain-shaped aliphatic isocyanate such as tetramethylene diisocyanate, 1,6-hexamethylene diisocyanate, dodecamethylene diisocyanate, trimethylhexamethylene diisocyanate, and lysine diisocyanate; aliphatic isocyanate having a cyclic structure such as 1,3-cyclohexylene diisocyanate, 1,4-cyclohexylene diisocyanate, hydrogenated xylylene diisocyanate, isophorone diisocyanate, 4,4'-dicyclohexylmethane diisocyanate, and 3,3'-dimethyl-4,4'-dicyclohexylmethane diisocyanate; and aromatic isocyanate such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, xylylene diisocyanate, and tetramethyl xylylene diisocyanate. When the urethane-based resin is synthesized, the polyisocyanate may be used singly or two or more types thereof may be used in combination.

Examples of the polyol include polyether polyol and polycarbonate polyol.

Examples of the polyether polyol include polyethylene glycol, polypropylene glycol, and polytetramethylene glycol.

Examples of polycarbonate polyol include the reaction products between diols such as 1,3-propanediol, 1,4-butanediol, 1,6-hexanediol, diethylene glycol, polyethylene glycol, polypropylene glycol, or polytetramethylene glycol and dialkyl carbonate such as phosgene and dimethyl carbonate, or cyclic carbonate such as ethylene carbonate.

When the urethane-based resin is synthesized, the polyol may be used singly, or two or more types thereof may be used in combination.

As the urethane-based resin, a polymer having the glass transition temperature (Tg) in the range of −70° C. to 80° C. is preferably used, a polymer having the glass transition temperature (Tg) in the range of −20° C. to 80° C. is more preferably used, a polymer having the glass transition temperature (Tg) in the range of 0° C. to 70° C. is particularly preferably used. If the glass transition temperature of the urethane-based resin is in the range described above, particularly, if the glass transition temperature is not lower than the lower limit, a clear image having less stickiness is formed. In addition, if the glass transition temperature of the urethane-based resin is in the range described above, particularly, if the glass transition temperature is not greater than the upper limit, since the clear image is easily coated, it is more difficult to decrease the glitter properties of the image.

A liquid type urethane-based resin which exists in a state of being dissolved in a solvent included in the clear ink composition and an emulsion-type urethane-based resin in which the urethane-based resin is dispersed in the clear ink composition in a particle shape can be used. Among these, the urethane-based resin is preferably the emulsion type. Since the emulsion-type urethane-based resin is in a particle shape, it is difficult to penetrate into the glitter image compared with the liquid-type urethane resin. Therefore, the glitter pigment in the image disturbs the arrangement in the urethane-based resin less, and thus the excellently glitter image is easily obtained.

The emulsion-type resin can be classified into a self-emulsifying type in which a hydrophilic group and the like is introduced to the resin and the resin is dispersed, and a forcibly emulsified type in which the resin is dispersed by using an emulsifier such as a surfactant. Among these, the emulsion-type urethane-based resin is preferably a self-emulsifying type in which the hydrophilic group is introduced to the urethane-based resin. The self-emulsifying emulsion-type urethane-based resin can further increase water resistance compared with the forcibly emulsified type.

Examples of the self-emulsifying emulsion-type urethane-based resin include a urethane resin having a structure of salt of a carboxyl group (for example, carboxylate salt), a urethane resin having a carboxyl group, a urethane resin having a carbonate structure, and a urethane resin having a sulfone group.

In addition, as the self-emulsifying emulsion-type urethane-based resin, commercially available products can be used, and examples thereof include SF210 (product name, manufactured by DKS Co., Ltd.) and WBR-2018 (product name, manufactured by Taisei Fine Chemical Co., Ltd.).

If the urethane-based resin is used in the emulsion state, the average particle diameter of the urethane-based resin is preferably in the range of 10 nm to 135 nm, more preferably in the range of 10 nm to 110 nm, and still more preferably in the range of 20 nm to 80 nm. If the average particle diameter of the urethane-based resin is in the range described above, particularly, if the average particle diameter is not lower than the lower limit, the penetration of the urethane-based resin into the glitter image or the passing through the glitter image to come into contact with the recording medium can be reduced, and thus the glitter image can be more preferably coated. In addition, if the average particle diameter of the urethane-based resin is in the range described above, particularly, if the average particle diameter is not greater than the upper limit, the coating film formed by the resin becomes flat, so that the generation of the scattering light can be reduced, and it is more difficult to decrease the glitter properties of the image.

The ester-based resin is a polymer that can be obtained by polycondensing polyol and polycarboxylic acid. The ester-based resin can be synthesized by a well-known method.

Examples of polyol include ethylene glycol, diethylene glycol, 1,3-propanediol, 1,4-butanediol, 1,4-cyclohexanedimethanol, trimethylolpropane, and pentaerythritol. When the ester-based resin is synthesized, the polyol may be used singly, or two or more types thereof may be used in combination.

Examples of polycarboxylic acid include oxalic acid, succinic acid, tartaric acid, maleic acid, citric acid, phthalic acid, isophthalic acid, terephthalic acid, 2,6-naphthalenedicarboxylic acid, and adipic acid. When the ester-based resin is synthesized, the polycarboxylic acid may be used singly, or two or more types thereof may be used in combination.

The glass transition temperature (Tg) of the ester-based resin is preferably in the range of −70° C. to 80° C., more preferably in the range of −20° C. to 80° C., and particularly preferably in the range of 0° C. to 70° C. The reason it is preferable that the glass transition temperature of the ester-based resin is in the above range is as described for the urethane-based resin above.

The liquid-type ester-based resin which exists in a state of being dissolved in a solvent included in the clear ink composition, and an emulsion-type ester-based resin in which the ester-based resin is dispersed in the clear ink composition in a particle shape can be used. Among these, the ester-based resin is preferably an emulsion type. The reason the emulsion-type ester-based resin is preferable is as described for the urethane-based resin above.

As the emulsion-type ester-based resin, any one of a forcibly emulsified type and a self-emulsifying type can be used, but for the same reason as for the urethane-based resin, a self-emulsifying type is preferable.

As the self-emulsifying emulsion-type ester-based resin, commercially available products can be used, and examples thereof include Eastek 1100 and 1300 (above are product names manufactured by Eastman Chemical Japan Limited), and Elitel KZA-1449 and KZA-3556 (above are product names manufactured by Unitika Ltd.).

If the ester-based resin is used in an emulsion state, the average particle diameter of the ester-based resin is preferably in the range of 10 nm to 135 nm, more preferably in the range of 10 nm to 110 nm, and particularly preferably in the range of 20 nm to 80 nm. The reason it is preferable that the average particle diameter of the ester-based resin is in the above range is as described for the urethane-based resin above.

The fluorene-based resin can be obtained by causing a polyol component including a first diol containing a fluorene skeleton and a second diol having a hydrophilic group to react with a polyisocyanate component containing a polyisocyanate compound. The fluorene-based resin is preferable in that the light resistance and the gas resistance of the image can be improved in addition to the function of improving friction resistance, while glitter properties of the image are maintained.

Examples of the first diol containing a fluorene skeleton include 9,9-bis(4-(hydroxymethoxy)phenyl)fluorene, 9,9-bis(4-(2-hydroxyethoxy)phenyl)fluorene, 9,9-bis(4-(3-hydroxypropoxy)phenyl)fluorene, 9,9-bis(4-(4-hydroxybutoxy)phenyl)fluorene, 9,9-bis(4-hydroxyphenyl)fluorene, 9,9-bis(4-hydroxytoluyl)fluorene, and 9,9-bis(hydroxyalkyl)fluorene. In addition, as the first diol, commercially available products may be used, and examples thereof include bisphenoxyethanolfluorene, bisphenolfluorene, and biscresolfluorene (above are product names manufactured by Osaka Gas Chemicals Co., Ltd.).

The first diol containing a fluorene skeleton may be used singly, or two or more types thereof may be used in combination. 9,9-bis(4-(2-hydroxyethoxy)phenyl)fluorene is preferably included.

In addition, the first diol containing the fluorene skeleton can be combined to the fluorene-based resin, for example, in the ratio of 40 to 60% by mass. If the content of the first diol containing the fluorene skeleton is in the range described above, the friction resistance and the transparency become satisfactory.

The second diol can have a hydrophilic group. Examples of the hydrophilic group include a nonionic group such as a polyoxyethylene group, and an ionic group such as a carboxyl group, a sulphonyl group, a phosphate group, and a sulfobetaine group.

Specific examples of the second diol having a carboxyl group include dihydroxyl carboxylic acid such as 2,2-dimethylol acetic acid, 2,2-dimethylol lactic acid, 2,2-dimethylolpropionic acid(2,2-bis(hydroxymethyl)propioic acid), 2,2-dimethylol butanoic acid, 2,2-dimethylol butyric acid, and 2,2-dimethylol valeric acid; and diaminocarboxylic acid such as lysine and arginine.

In addition, specific examples of the second diol having a sulphonyl group include N,N-bis(2-hydroxyethyl)-2-aminoethanesulfonic acid, 1,3-phenylenediamine-4,6-disulfonic acid, diaminobutane sulfonic acid, 3,6-diamino-2-toluenesulfonic acid, and 2,4-diamino-5-toluenesulfonic acid.

In addition, specific examples of the second diol having a phosphate group include 2,3-dihydroxypropylphenyl phosphate.

In addition, specific examples of the second diol having a group with a betaine structure include a sulfobetaine group-containing compound obtained by the reaction between a tertiary amine such as N-methyl diethanolamine and 1,3-propanesultone.

Further, as the second diol, an alkylene oxide modified product obtained by adding an alkylene oxide such as ethylene oxide or propylene oxide to the second diol is included.

The second diol may be used singly, or two or more types thereof may be used in combination. The second diol having a carboxyl group is preferably included, and, for example, 2,2-dimethylolpropionic acid is included.

The first diol having a hydrophilic group can be combined with the fluorene-based resin, for example, in the ratio of 5 to 15% by mass. If the content of the first diol containing a fluorene skeleton is in the range described above, friction resistance and transparency become satisfactory.

The second diol can be combined so that an acidic value of the fluorene-based resin is in the range of 10 to 130 KOHmg/g, and more preferably in the range of 20 to 60 KOHmg/g.

In addition, the fluorene-based resin may contain a polyol compound, if necessary. The polyol compound is a compound having two or more hydroxyl groups, and low molecular weight polyol and high molecular weight polyol may be included.

The polyisocyanate compound is a compound having two or more isocyanate groups, and preferably a compound having two isocyanate groups, and examples thereof include aliphatic polyisocyanate, alicyclic polyisocyanate, aromatic-aliphatic polyisocyanate, and aromatic polyisocyanate.

Examples of aliphatic polyisocyanate include hexamethylene diisocyanate and tetramethylene diisocyanate.

Examples of alicyclic polyisocyanate include isophorone diisocyanate (3-isocyanatomethyl-3,5,5-trimethylcyclohexyl isocyanate), 4,4'-, 2,4'- or 2,2'-dicyclohexylmethane diisocyanate, and mixtures thereof.

Examples of aromatic-aliphatic polyisocyanate include 1,3- or 1,4-xylylene diisocyanate, mixtures thereof, 1,3- or 1,4-bis(1-isocyanato-1-methylethyl)benzene, and mixtures thereof.

Examples of aromatic polyisocyanate include 4,4'-, 2,4'-, or 2,2'-diphenylmethane diisocyanate, mixtures thereof, 2,4-, or 2,6-tolylene diisocyanate, mixtures thereof, 4,4'-toluidine diisocyanate, and 1,5-naphthalene diisocyanate.

In addition, as the polyisocyanate compound, polymers of various polyisocyanate compounds (for example, dimer and trimer), a biuret modified product generated by the reaction of various polyisocyanate compounds described above or the polymer thereof with water, an allophanate modified product generated by the reaction with alcohol or the above described low molecular weight polyol, an oxadiazine trione modified product generated by the reaction with carbon dioxide, and a polyol modified product generated by the reaction with the above described low molecular weight polyol may be included.

The polyisocyanate compound may be used singly, or two or more types thereof may be used in combination. Alicyclic polyisocyanate is preferably included, and for example, isophorone diisocyanate is included.

Also, reaction between a polyol component (that is, first diol having fluorene skeleton, second diol having hydrophilic group, and polyol compound, if necessary) and a polyisocyanate component (that is, polyisocyanate compound) can be performed by a well-known method, for example, combination may be performed so that the equivalent ratio of the isocyanate group of the polyisocyanate component to a hydroxy group of the polyol component (NCO/hydroxy group) is in the ratio of 0.4 to 1.0, and preferably in the range of 0.8 to 0.95. Therefore, the combination to the fluorene-based resin may be performed, for example, in the ratio of 30 to 45% by mass. If the content of the first diol containing the fluorene skeleton is in the range described above, fixability and transparency become excellent.

The fluorene-based resin can be used in any form of a water insoluble resin (emulsion) and a water soluble resin, but it is preferable that the fluorene-based resin be used in the form of a water soluble resin. In addition, the weight average molecular weight of the fluorene-based resin is preferably in the range of 3,000 to 20,000, more preferably in the range of 5,000 to 15,000, and still more preferably in the range of 6,000 to 12,000. Further, the glass transition temperature (Tg) of the fluorene-based resin is preferably 0° C. or higher, more preferably in the range of 0° C. to 250° C., still more preferably in the range of 40° C. to 250° C., further more preferably in the range of 80° C. to 250° C., and particularly preferably in the range of 120° C. to 250° C.

Examples of the acryl-based resin includes a homopolymer of acrylic acid, acrylic acid ester, methacrylic acid, or methacrylic acid ester; and copolymers of these monomers and acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, or vinylidene chloride. In addition, the copolymer can be used in any form of a random copolymer, a block copolymer, an alternating copolymer, and a graft copolymer.

Examples of the acryl-based resin include a 3MF series manufactured by Taisei Fine Chemical Co, Ltd. such as 3MF-309S, 3MF-320, 3MF-333, 3MF-407, 3MF-574, and 3MF-587; acryl-based emulsion, Voncoat 40-418EF manufactured by DIC Corporation; ES-960MC manufactured by Takamatsu Oil & Fat Co., Ltd.; and EPG1200 manufactured by Mitsui Chemicals, Inc.

Polyolefin wax may be added to the clear ink composition. One of the functions of polyolefin wax is to increase sliding properties of the formed coating film. Accordingly, the friction resistance of the overcoat layer can be further improved.

The polyolefin wax is not particularly limited, and examples thereof include wax manufactured by olefin such as ethylene, propylene, and butylene, or derivatives thereof, and copolymers thereof. Specific examples of polyolefin wax include polyethylene-based wax, polypropylene-based wax, polybutylene-based wax, and paraffin-based wax. The polyolefin wax may be used singly, or two or more types thereof may be used in combination.

As the polyolefin wax, commercially available products can be used, and examples thereof include a Chemipearl series such as Chemipearl W4005(polyethylene-based product) manufactured by Mitsui Chemicals, Inc., a AQUACER series such as AQUACER 513, 515, 531, 552, and 840 (above are polyethylene-based products), 498, 537, 539 (above are paraffin-based products) manufactured by BYK Japan KK, Hitec series such as Hitec E-7025P, Hitec E-2213, Hitec E-9460, Hitec E-9015, Hitec E-4A, Hitec E-5403P, Hitec E-8237 (above are manufactured by TOHO Chemical Industry Co., Ltd.), and Nopcote PEM-17 (manufactured by San Nopco Limited, polyethylene emulsion, particle diameter of 40 nm). These are commercially available in the form of aqueous emulsion in which polyolefin wax is dispersed in water by a common method.

When polyolefin wax is contained, the content in terms of solid content is preferably in the range of 0.05% by mass to 2% by mass and more preferably in the range of 0.1% by mass to 1% by mass with respect to the total mass of the clear ink composition. If the content of the polyolefin wax is in the range described above, friction resistance may be further improved while glitter properties of the image are maintained.

A water soluble organic solvent, a surfactant, a pH regulator, water, a preservative or a fungicide, an antirust agent, and a chelating agent which are described for the glitter ink composition may be added to the clear ink composition, if necessary.

3. Method

Next, methods according to the exemplary embodiment are described with reference to the drawings.

The ink jet recording system according to the exemplary embodiment includes a first mode for recording a security image and a second mode for recording a non-security image, as plural recording modes.

Figure 3:
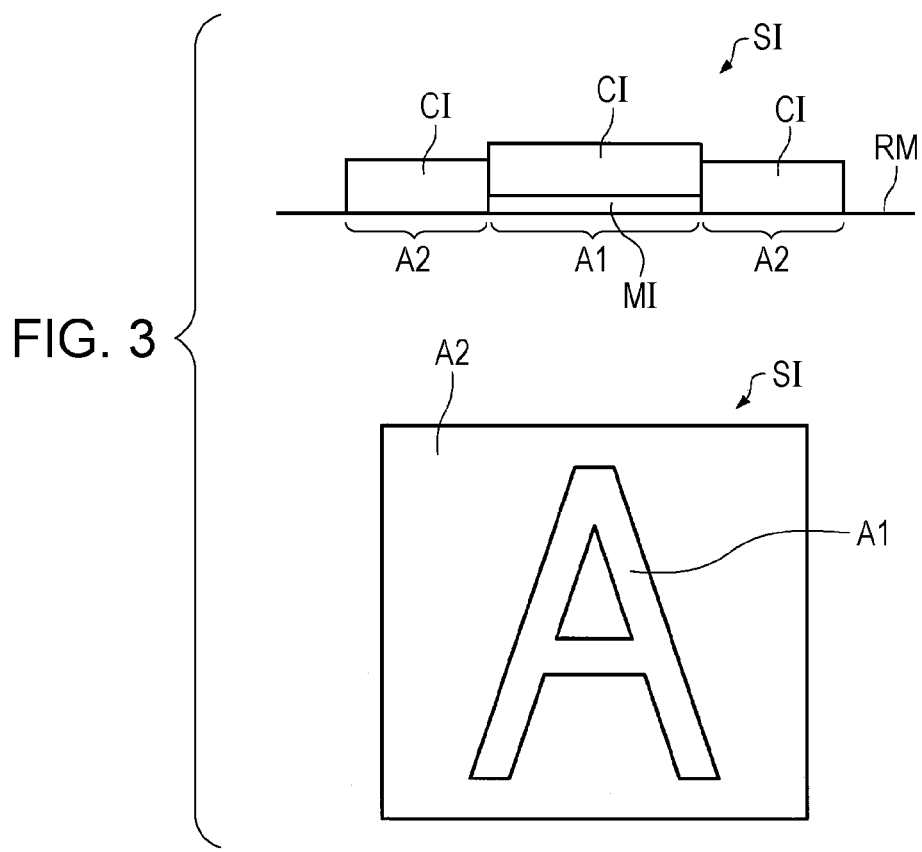
FIG. 3 is a diagram illustrating a security image recorded by the ink jet recording system according to the exemplary embodiment.

FIG. 3 is a diagram illustrating a security image recorded by the ink jet recording system according to the exemplary embodiment.

As illustrated in FIG. 3, in the first mode, a glitter image MI is formed by ejecting a glitter ink composition in a first image area A1 on a white recording medium RM, a color image CI is formed by ejecting the color ink composition thereto, and further the color image CI is formed by ejecting the color ink composition to a second image area A2 in contact with the first image area A1 (around the first image area A1). Accordingly, a security image SI corresponding to the input image is recorded on the recording medium RM.

One of the first image area A1 and the second image area A2 is an area corresponding to a character or the like (information image such as character, bar code, and diagram) in the input image, and the other is an area corresponding to the background (background image) of the information image. In the example of FIG. 3, the area corresponding to the character is set to be the first image area A1, and the area corresponding to the background is set to be the second image area A2, but both may be shifted to each other.

Colors of the color image CI formed in the first image area A1 and the color image CI formed in the second image area A2 are colors corresponding to colors of characters or the like in the input image. In addition, the ejection amount for each unit area of the color ink composition in the first image area A1 and the ejection amount for each unit area of the unit area of the color ink composition in the second image area A2 are caused to be equal, and the difference therebetween is preferably 10% or lower.

Figure 4A:
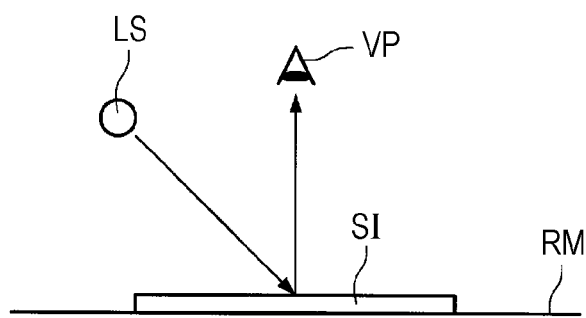
FIGS. 4A and 4B are diagrams illustrating angles of viewpoints in which a security image is observed.

The security image SI is an image in which visibility of the information image such as character changes according to the change of the angle of the observed view point. That is, if the security image SI is observed when a light source LS and a view point VP have a positional relationship illustrated in FIG. 4A (if the view point VP is in a diffusion light area), an amount of reflected light that reaches from the glitter image MI of the first image area A1 to the view point VP is less than an amount of the reflected light that reaches from the recording medium RM in the second image area A2 to the view point VP, and thus a color tone difference (brightness difference) between an image (information image such as character) formed in the first image area A1 and an image (background image) formed in the second image area A2 is easily recognized. Therefore, the information image of the character or the like can be recognized.

Figure 4B:
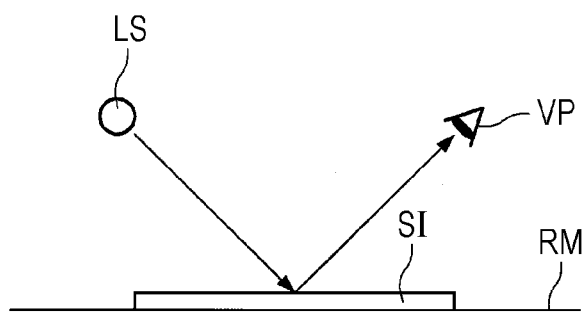

Meanwhile, if the security image SI is observed when the light source LS and the view point VP are in the positional relationship illustrated in FIG. 4B (when the view point VP is in regular reflected light area), the amount of the reflected light that reaches from the glitter image MI of the first image area A1 to the view point VP and the amount of the reflected light reaching from the recording medium RM in the second image area A2 to the view point VP both become significant, and thus a color tone difference (brightness difference) between the image formed in the first image area A1 and the image formed in the second image area A2 are hardly recognized. Therefore, the information image of characters or the like cannot be recognized.

Figure 5:
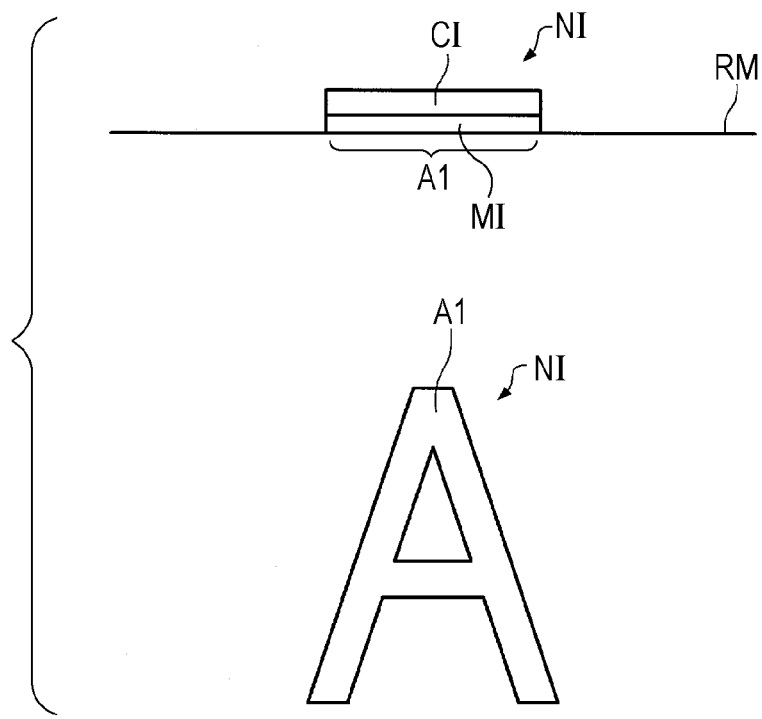
FIG. 5 is a diagram illustrating a non-security image which is recorded by the ink jet recording system according to the exemplary embodiment.

FIG. 5 is a diagram illustrating a non-security image recorded by the ink jet recording system according to the exemplary embodiment.

As illustrated in FIG. 5, in the second mode, the glitter image MI is formed by ejecting the glitter ink composition to the first image area A1 on the recording medium RM, and the color image CI is formed by ejecting the color ink composition thereto. Accordingly, a non-security image NI corresponding to the input image is recorded on the recording medium RM. In the second mode, since the color image CI is not formed in the second image area A2, an information image such as the character can be recognized regardless of the angle of the view point VP.

According to the exemplary embodiment, the ejection amount (laminate thickness of the color image CI) for each unit area of the color ink composition of the first image area A1 in the first mode is set to be greater than the ejection amount for each unit area of the color ink composition in the first image area A1 in the second mode. In this manner, when the security image SI is recorded in the first mode, if the ejection amount of the color ink composition is caused to be significant, the metallic appearance of the glitter image MI can be lost by the scattering of the color image CI, and accordingly, the security image SI in which the change of the visibility by the change of the viewpoint angle is significant can be recorded. In addition, when the non-security image NI is recorded in the second mode, the scattering by the color image CI can be suppressed by reducing the ejection amount of the color ink composition, the non-security image NI having high metallic color appearance can be recorded.

Figure 6:
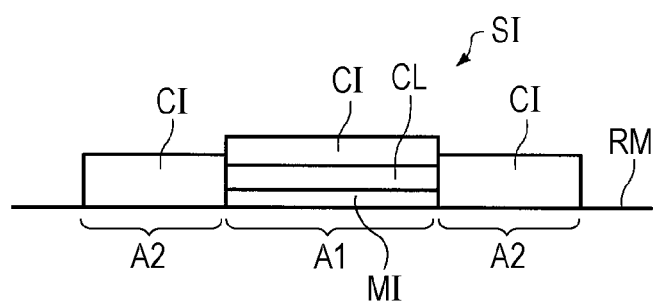
FIG. 6 is a diagram illustrating a security image which is recorded by the ink jet recording system according to the exemplary embodiment.

In addition, as illustrated in FIG. 6, in the first mode, a clear image CL is formed by ejecting the clear ink composition to the glitter image MI, the color image CI is formed by ejecting the color ink composition on the clear image CL, and thus the security image SI may be recorded on the recording medium RM. In addition, a third mode for forming the clear image CL between the glitter image MI and the color image CI is prepared as a recording mode different from the first mode illustrated in FIG. 3, and the invention may be configured so as to cause the user to select any one of the first mode and the third mode as a mode for recording the security image SI. When the clear image CL is formed between the glitter image MI and the color image CI, the ejection amount of the color ink composition in the first image area A1 may be less than the case in which the clear image CL is not formed. If the clear image CL is formed between the glitter image MI and the color image CI, even if the ejection amount of the color ink composition in the first image area A1 is reduced, the security image SI in which the change of the visibility by the change of the viewpoint angle is significant can be recorded. In addition, friction resistance of the printed image can be improved by forming the clear image CL. In addition, the ejection amount of the color ink composition in the second image area A2 may be reduced by forming the clear image CL even in a portion between the recording medium RM and the color image CI in the second image area A2.

Here, according to the color tone of the color image CI in the first image area A1 and the second image area A2, the security image SI having low security properties (in which change of visibility by change of viewpoint angle is small) may be recorded. For example, if the color of the color image CI is yellow, since the difference between an L value of the image formed in the first image area A1 and an L value of the image formed in the second image area A2 is great, the change of the visibility by the change of the viewpoint angle becomes smaller. Meanwhile, for example, if the color of the color image CI is blue, since a difference between an L value of the image formed in the first image area A1 and an L value of the image formed in the second image area A2 is small, and thus the change of the visibility by the change of the viewpoint angle becomes greater. Here, if the color tone of the information image such as the character in the input image does not satisfy a predetermined condition, the security properties of the security image corresponding to the input image are determined to be low, and the notification of warning to the user of the determination may be performed. In addition, if security properties of the security image are determined to be low, the color tone of the color image CI on at least one of the first image area A1 and the second image area A2 may be automatically adjusted so that a difference between the L value of the image formed in the first image area A1 and the L value of the image formed in the second image area A2 becomes small.

In addition, also in the case in which an area of the first image area A1 is small, the security image SI having low security properties may be recorded. Therefore, when the area of the information image of the character and the like in the input image is the predetermined value or lower, security properties of the security image corresponding to the input image are determined to be low, and warning of the determination is notified to the user, or the adjustment of enlarging areas of the first image area A1 and the second image area A2 may be performed.

4. Process

Figure 7:
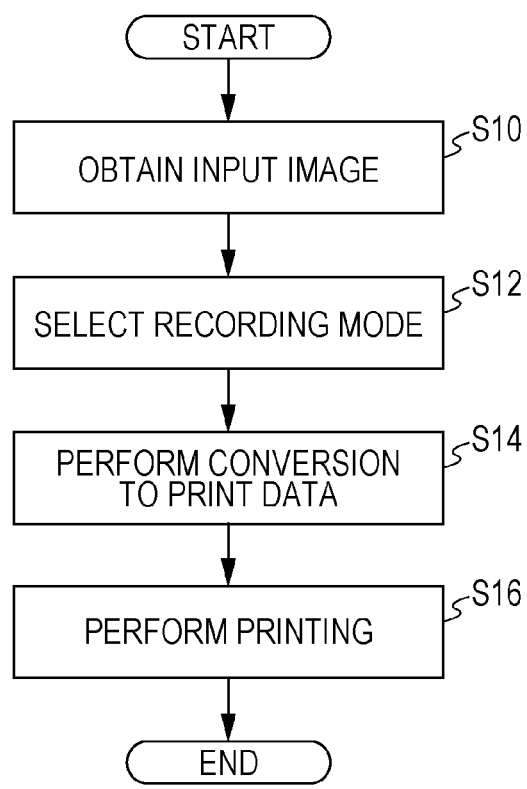
FIG. 7 is a flow chart illustrating a flow of a process in the ink jet recording system according to the exemplary embodiment.

FIG. 7 is a flow chart illustrating a flow of a process in the ink jet recording system according to the exemplary embodiment.

First, the process portion 100 acquires data of the input image which becomes a print target (Step S10). Next, the mode selecting portion 102 selects a recording mode based on the operation information from the operation portion 110 (Step S12).

Subsequently, the process portion 100 (the ejection amount control portion 104) converts data of the input image to print data (recording data) based on the selected recording mode (Step S14). That is, when the RGB data of the input image is converted to the CMYK data and further converted to the dot generation rate data, the print data for printing a security image corresponding to the input image is generated when the first mode (or third mode) is selected, and the print data for printing the non-security image corresponding to the input image is generated when the second mode is selected. Here, when the first mode (or third mode) is selected, the process portion 100 may cause the security image creating screen to be displayed on the display portion 120, cause the screen to display the input image (security pattern image), automatically dispose the print data of the color image around the character or the like (security pattern) of the input screen, and generate the print data of the security image. In addition, when the first mode (or third mode) is selected, security properties of the security image corresponding to the input image may be determined, and the determination result (warning or the like) may be displayed on the security image creating screen. In this case, according to the determination result, the invention may be configured so that the user can adjust the color tone (or size of character or the like of input image) of the character or the like of the input image and the color image around the character, or automatic adjustment may be performed according to the determination result, and to display the results thereof.

The print data converted in this manner is output to the ink jet recording device 10, and the security image or the non-security image is printed by the ink jet recording device 10 (Step S16).

5. Evaluation Result

A security image was printed on the recording medium by the method according to the exemplary embodiment, and evaluation on visibility was performed.

As the glitter ink composition, aluminum ink made of 1.2% by mass of an aluminum pigment, 0.5% by mass of a urethane resin, 12% by mass of hexylene glycol, 28% by mass of propylene glycol, 0.4% by mass of BYK-348 (manufactured by BYK Japan KK), 0.15% by mass of triethanolamine, and 57.75% by mass of water was used.

In addition, as the color ink composition, cyan ink made of 3% by mass of Pigment Blue 15:3 (cyan pigment), 12% by mass of glycerin, 4% by mass of 2-pyrrolidone, 3% by mass of 1,2-hexanediol, 0.4% by mass of BYK-348 (manufactured by BYK Japan KK), 0.2% by mass of triethanolamine, and 77.4% by mass of water was used.

In addition, as the clear ink composition, clear ink made of 3% by mass of fluorene, 5% by mass of 1,2-hexanediol, 12% by mass of propylene glycol, 4% by mass of 2-pyrrolidone, 0.5% by mass of tripropanolamine, 1% by mass of AQUACER 515 (manufactured by BYK Japan KK), 0.5% by mass of BYK-348 (manufactured by BYK Japan KK), and 74% by mass of water was used.

As an ink set, the glitter ink composition, the color ink composition, and the clear ink composition were mounted on the ink jet printer (product name "PX-G930" manufactured by Seiko Epson Corp.). Then, a security image made of the glitter ink composition, the color ink composition, and the clear ink composition was formed (printed) on a recording medium (Epson genuine photo paper <Gloss> manufactured by Seiko Epson Corp.). Specifically, a glitter image made of a glitter ink composition was formed on the first image area (area corresponding to character), a clear image made of the clear ink composition was formed on the glitter image (was not formed in some cases), the color image made of the color ink composition was formed on the clear image, and a color image made of the color ink composition was formed on the second image area (area corresponding to background).

Also, visibility of the security images was evaluated by changing a weight (mg/inch$^2$) of the glitter pigment for each unit area in the glitter ink composition ejected to the first image area, a duty (%) of the clear ink composition ejected to the first image area, and a weight (mg/inch$^2$) of the color material for each unit area in the color ink composition ejected to the first image area and the second image area, and weights of the color material for each unit area in the color ink composition when a character (image formed in first image area) in the security image at a specific viewpoint angle (regular reflected light area) was not able to be recognized were evaluated. The evaluation results are presented in Table.

TABLE

| Glitter ink composition | | | Duty of clear ink composition | | |
|---|---|---|---|---|---|
| | | | 0 | 20 | 40 |
| Duty (%) | Weight (mg/inch$^2$) of pigment | Coating ratio (%) | Weight (mg/inch$^2$) of color material when character was not able to be recognized | | |
| 40 | 0.062 | 95.2 | 0.273 | 0.234 | 0.195 |
| 20 | 0.031 | 47.6 | 0.234 | 0.195 | 0.156 |
| 10 | 0.015 | 23.8 | 0.195 | 0.156 | 0.117 |
| 5 | 0.008 | 11.9 | 0.156 | 0.117 | 0.078 |

From Table, it was found that if the ejection amount of the glitter ink composition is small, the ejection amount of the color ink composition can also be small. In addition, if the ejection amount of the clear ink composition is caused to be significant, the ejection amount of the color ink composition can be reduced. In addition, when the character in the security image was not able to be recognized at a specific viewpoint angle, it was found that the color material weight A for each unit area in the color ink composition and the weight C of the glitter pigment for each unit area in the glitter ink composition satisfy the following relationship: $0.3 \geq C/(A+C) \geq 0.045$.

In addition, the recording medium on which the security image was formed under the conditions above was copied by a color copier to create a copy, and it was confirmed that visibility of the created copy did not change by the change of the viewpoint angle (created copy had forgery prevention effect).

The technical scope of the invention is not limited to the embodiment described above, and can be appropriately modified without departing from the gist of the invention.

The entire disclosure of Japanese Patent Application No. 2014-145666, filed Jul. 16, 2014 is expressly incorporated by reference herein.

What is claimed is:

1. An ink jet recording system comprising:
an ink jet recording device; and
a control portion that controls the ink jet recording device,
wherein the ink jet recording device includes
  a glitter ink composition including a glitter pigment, the glitter pigment being an aluminum pigment having a flat shape,
  a color ink composition including a pigment having a greater visible light absorbing amount than the glitter pigment, and
  an ejection head that ejects the glitter ink composition and the color ink composition onto a recording medium,
wherein the control portion includes
  a mode selecting portion that selects one recording mode from the plurality of recording modes in which at least one of an ejection amount of the glitter ink composition and an ejection amount of the color ink composition is different, and
  an ejection amount control portion including the ejection amount of the glitter ink composition ejected from the ejection head and the ejection amount of the color ink composition ejected from the ejection head based on an input image input by the user and the selected recording mode,
wherein when a first mode is selected from the plurality of recording modes, the ejection amount control portion performs control of recording a security image corresponding to the input image on the recording medium by performing control of forming a glitter image by the glitter ink composition in a first image area on the recording medium, forming a color image by the color ink composition in the glitter image, and forming a color image by the color ink composition in a second image area that is in contact with the first image area, and
wherein a color material weight A for each unit area in the color ink composition elected to the first image area in the first mode, a color material weight B for each unit area in the color ink composition ejected to the second image area in the first mode, and a glitter pigment weight C for each unit area in the glitter ink composition elected to the first image area in the first mode have the following relationships:

$0.3 \geq C/(A+C) \geq 0.045$, $0.3 \geq C/(B+C) \geq 0.045$, and $1.1 \geq A/B \geq 0.9$.

2. The ink jet recording system according to claim 1, wherein, when a second mode is selected from the plurality of recording modes, the ejection amount control portion performs control of recording a non-security image corresponding to the input image on the recording medium, by performing control of forming the glitter image by the glitter ink composition on the first image area, and forming the color image by the color ink composition on the glitter image, and wherein an ejection amount for each unit area of the color ink composition on the first image area in the first mode is greater than an ejection amount for each unit area of the color ink composition on the first image area in the second mode.

3. The ink jet recording system according to claim 1, wherein the first image area or the second image area is an area corresponding to a character, a bar code, or a diagram in the input image.

4. The ink jet recording system according to claim 1, wherein the ejection amount control portion performs control of forming a clear image by a clear ink composition in which a color material is not substantially contained between the glitter image and the color image in the first image area.

5. The ink jet recording system according to claim 1, wherein, when a third mode is selected from the plurality of recording modes, the ejection amount control portion performs control of recording the security image corresponding to the input image on the recording medium by performing control of forming the glitter image in the first image area, forming a clear image by a clear ink composition in which a color material is not substantially contained in the glitter image, and forming the color image on the clear image, and forming the color image in the second image area, and wherein an ejection amount for each unit area of the color ink composition on the first image area in the third mode is smaller than an ejection amount for each unit area of the color ink composition on the first image area in the first mode.

6. The ink jet recording system according to claim 1, wherein the control portion performs a process of notifying a user of a warning when security properties of the security image corresponding to the input image are determined to be low.

7. The ink jet recording system according to claim 1, wherein the control portion performs control of changing a color of the color image in the first mode when security properties of the security image corresponding to the input image are determined to be low.

8. The ink jet recording system, according to claim 7, wherein the control portion performs the control of changing the color of the color image so that a brightness value (L value) of the image formed in the first image area and a brightness value (L value) of the image formed in the second image area are close to each other.

9. The ink jet recording system according to claim 1, wherein the control portion performs control of changing an area of at least one of the first image area and the second image area in the first mode when security properties of the security image according to the input image are determined to be low.

10. The ink jet recording system according to claim 1, wherein a weight of the glitter pigment for each unit area in the glitter ink composition ejected to the first image area in the first mode is in a range of 0.008 mg/inch$^2$ to 32.3 mg/inch$^2$.

11. The ink jet recording system according to claim 1, wherein the control portion causes a security image creating screen to be displayed on a display portion, and causes recording data of a security image created for creating the security image to be output on the ink jet recording device.

12. The ink jet recording system according to claim 11, wherein, when a security pattern image is input in the security image creating screen, the control portion disposes recording data of the color image around the security pattern in the security pattern image and generates the recording data of the security image.

* * * * *